United States Patent
Xu et al.

(10) Patent No.: US 8,004,861 B2
(45) Date of Patent: Aug. 23, 2011

(54) PARAMETER CONFIGURATION METHOD FOR ELEMENTS OF POWER FACTOR CORRECTION FUNCTION CONVERTER

(75) Inventors: Ming Xu, Blacksburg, VA (US); Bo Zhang, Xi'an (CN); Kai Yao, Nanjing (CN); Qiaoliang Chen, Xi'an (CN)

(73) Assignee: FSP Technology Inc., Taoyuan, Taoyuan Hsien (TW)

( * ) Notice: Subject to any disclaimer, the term of this patent is extended or adjusted under 35 U.S.C. 154(b) by 309 days.

(21) Appl. No.: 12/425,120

(22) Filed: Apr. 16, 2009

(65) Prior Publication Data

US 2010/0265745 A1     Oct. 21, 2010

(51) Int. Cl.
*H02M 3/335*     (2006.01)
(52) U.S. Cl. ..................... 363/21.01; 363/131
(58) Field of Classification Search .............. 363/20, 363/21.01, 21.02, 21.12, 89, 95, 97, 125, 363/126, 131
See application file for complete search history.

(56) References Cited

U.S. PATENT DOCUMENTS

| | | | | |
|---|---|---|---|---|
| 5,003,454 A | * | 3/1991 | Bruning | 363/81 |
| 5,604,411 A | * | 2/1997 | Venkitasubrahmanian et al. | 315/307 |
| 5,631,550 A | * | 5/1997 | Castro et al. | 323/283 |
| 5,661,645 A | * | 8/1997 | Hochstein | 363/89 |
| 6,775,160 B2 | * | 8/2004 | Siri | 363/89 |
| 7,804,256 B2 | * | 9/2010 | Melanson | 315/291 |
| 2005/0212501 A1 | * | 9/2005 | Acatrinei | 323/283 |

FOREIGN PATENT DOCUMENTS

TW     561675     11/2003

* cited by examiner

*Primary Examiner* — Adolf Berhane
(74) *Attorney, Agent, or Firm* — Muncy, Geissler, Olds & Lowe, PLLC

(57) ABSTRACT

The present invention discloses a parameter configuration method for elements of a PFC function converter. The converter has a PFC circuit modulating an input power into a DC modulated power and a transformer transforming the DC modulated power into an output power. The method of the present invention comprises a storage capacitor configuration procedure, a storage inductor configuration procedure and a verification procedure. The storage capacitor configuration procedure predetermines a test voltage and a rated bus voltage lower than the test voltage, determines a parameter of the storage capacitor according to the test voltage and uses the storage capacitor to supply the rated bus voltage. The storage inductor configuration procedure determines an inductance of a storage inductor to match the storage inductor and the primary coil of the transformer work in a discontinuous current mode. The verification procedure verifies whether the power factor of the converter exceeds 0.9.

4 Claims, 5 Drawing Sheets

PARAMETER CONFIGURATION METHOD FOR ELEMENTS OF POWER FACTOR CORRECTION FUNCTION CONVERTER

FIELD OF THE INVENTION

The present invention relates to a parameter configuration method for elements of a PFC function converter, particularly to a method adapting a PFC function converter to a storage capacitor having a smaller capacitance via varying the operation characteristic of a PFC circuit.

BACKGROUND OF THE INVENTION

In electronic industry, the well-known PFC (Power Factor Correction) circuit is an important circuit which improves the input power factor used in power supply devices or built in the power supply circuits of various electric appliances. The common PFC circuits may be categorized into the single-stage type and the two-stage type, which are respectively applied to different fields. The two-stage PFC circuit has a higher power factor and a lower total harmonic distortion. The single-stage PFC circuit is simpler and cheaper, however. Either of the two types of PFC circuits should have a storage capacitor, i.e. the so-called bulk capacitor, for energy regulation. For an example of the single-stage PFC circuit, please refer to a R.O.C. patent No. 561675 disclosing a "PFC Circuit with an Oscillation-Damping Circuit". FIG. 1 of the prior-art patent schematically shows the architecture of a basic PFC circuit. In FIG. 1 of the prior-art patent, the PFC circuit comprises an inductor 107, a diode 108, a capacitor 109 and a switch 106. The capacitor 109 functions as the storage capacitor. An input circuit 101 inputs a pulsed DC power to the single-stage PFC circuit. If the switch 106 is turned on, the power of the pulsed DC power is stored in the capacitor 109. At the same time, the capacitor 109 outputs power to the load 105. While the switch 106 is turned off, the inductor 107 transfers power to the capacitor 109. Such an operation mode generates a modulated power to the load 105. Since the technology of the PFC circuit is a prior art familiar to the people having ordinary knowledge in the related fields, it will not repeat herein.

To achieve the standard of IEC 1000-3-2 (International Electrotechnical Commission), the bus voltage $V_{bus}$ (the voltage of the main power transmission path) of the abovementioned power supply device should have a small low-frequency ripple. To achieve a high power factor, the bus voltage $V_{bus}$ should be raised. In the conventional technology, only an electrolytic capacitor can realize the abovementioned objectives. Therefore, electrolytic capacitors are generally used in PFC circuits. Further, the conventional PFC circuit is operated in a discontinuous current mode (DCM) to increase the utility rate of the iron core of the transformer and promote the stability of single-loop control.

However, the electrolytic capacitor has a shorter lifetime. A solid electrolytic capacitor has a lifetime of only thousands of hours at a temperature of 105° C., and a liquid one has a further shorter lifetime. When an electrolytic capacitor is used as the storage capacitor of a PFC circuit, the lifetime of the electrolytic capacitor directly limits the lifetime of the PFC circuit. For example, in an LED driving circuit, LED itself has a lifetime of at least one hundred thousands of hours. However, since the reduction of the storage capacitor, the PFC circuit of the LED driving circuit can only work for thousands of hours (the storage capacitor has an average lifetime of only thousands of hours). Thus, when the storage capacitor breaks down, the circuit board of the PFC circuit and the LEDs soldered on the circuit board have to be replaced at the same time. Thus, the LEDs should be abandoned even before one half of the lifetime thereof has elapsed, which is indeed a waste of the resource. Therefore, it is very deserving to solve the problem that the lifetime of a PFC circuit is limited by the lifetime of the storage capacitor thereof.

SUMMARY OF THE INVENTION

The primary objective of the present invention is to provide a parameter configuration method for elements of a PFC function converter to solve the problem that the lifetime of a PFC circuit is limited by the lifetime of the storage capacitor thereof, wherein the lifetime of the storage capacitor is prolonged via configuring the relationship of the elements of the converter circuit with the power factor satisfying the standard without varying the circuit architecture of the PFC circuit, whereby the lifetime of the converter is increased.

The present invention proposes a parameter configuration method for elements of a PFC function converter, wherein the converter has a PFC circuit converting an input power into a modulated power and a transformer transforming the modulated power into an output power to a load. The method of the present invention comprises a storage capacitor configuration procedure, a storage inductor configuration procedure and a verification procedure. The storage capacitor configuration procedure predetermines a test voltage and a rated bus voltage lower than the test voltage, determines a storage capacitor parameter according to the test voltage, and uses the storage capacitor to supply the rated bus voltage to the converter. The storage inductor configuration procedure selects the inductance of the primary coil of the transformer firstly and then determines the inductance of the storage inductor to make the storage inductor and the primary coil work in a discontinuous current mode. Then, the verification procedure verifies whether the configuration for the PFC circuit makes the power factor exceed 0.9. The converter adopts a storage capacitor, which is adaptive to the test voltage, to provide a rated bus voltage lower than the test voltage, and the storage capacitor thus receives less voltage fluctuation. As the converter operates in a discontinuous current mode, the designer can use a lower-capacitance capacitor as the storage capacitor. Particularly, the designer can replace the conventionally used electrolytic capacitor with a film capacitor. Thus, the storage capacitor has a longer lifetime, and the lifetime of the converter is no more limited by the lifetime of the storage capacitor.

The present invention adopts a smaller capacitor, particularly a film capacitor, as the storage capacitor. Therefore, the present invention can prolong the lifetime of the PFC circuit.

DETAILED DESCRIPTION OF THE PREFERRED EMBODIMENTS

Figure 1:
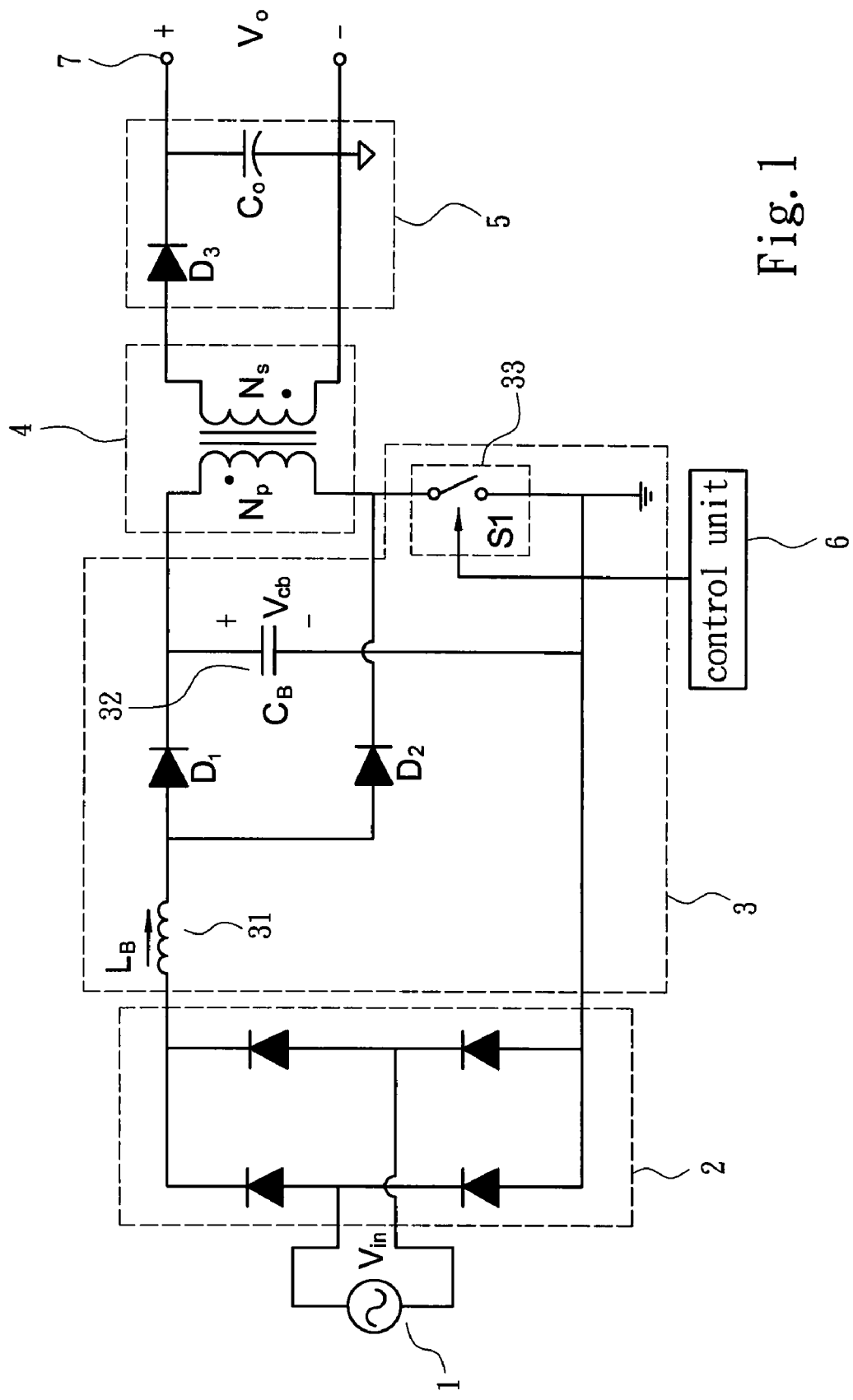
FIG. 1 is a diagram schematically showing the circuit of a converter.

The present invention discloses a parameter configuration method for elements of a PFC function converter. Refer to FIG. 1. The converter has a PFC circuit 3 and a transformer 4. The PFC circuit 3 modulates an input power into a DC modulated power in a discontinuous current mode. The transformer 4 transforms the DC modulated power into an output power 7 to a load. The converter may include a rectifier circuit 2 connected to a power source 1 to obtain the input power, and an output unit 5 connected to the secondary coil of the transformer 4. The rectifier circuit 2 receives the input power and modulates the input power into a pulsed DC power. The PFC circuit 3 behind the rectifier circuit 2 receives the pulsed DC power and modulates the pulsed DC power into a modulated power. The transformer 4 receives the modulated power and transforms the modulated power. The output unit 5 receives the induced power from the secondary side of the transformer 4 and then uses a conventional circuit, such as a regulation circuit, a filtering circuit or an impedance-matching circuit, to process the induced power into the output power 7 driving a load. The technologies of the rectifier circuit 2 and the output unit 5 are well-known to the field related; therefore, they are not the key points of the present invention and will not repeat herein.

Figure 2:
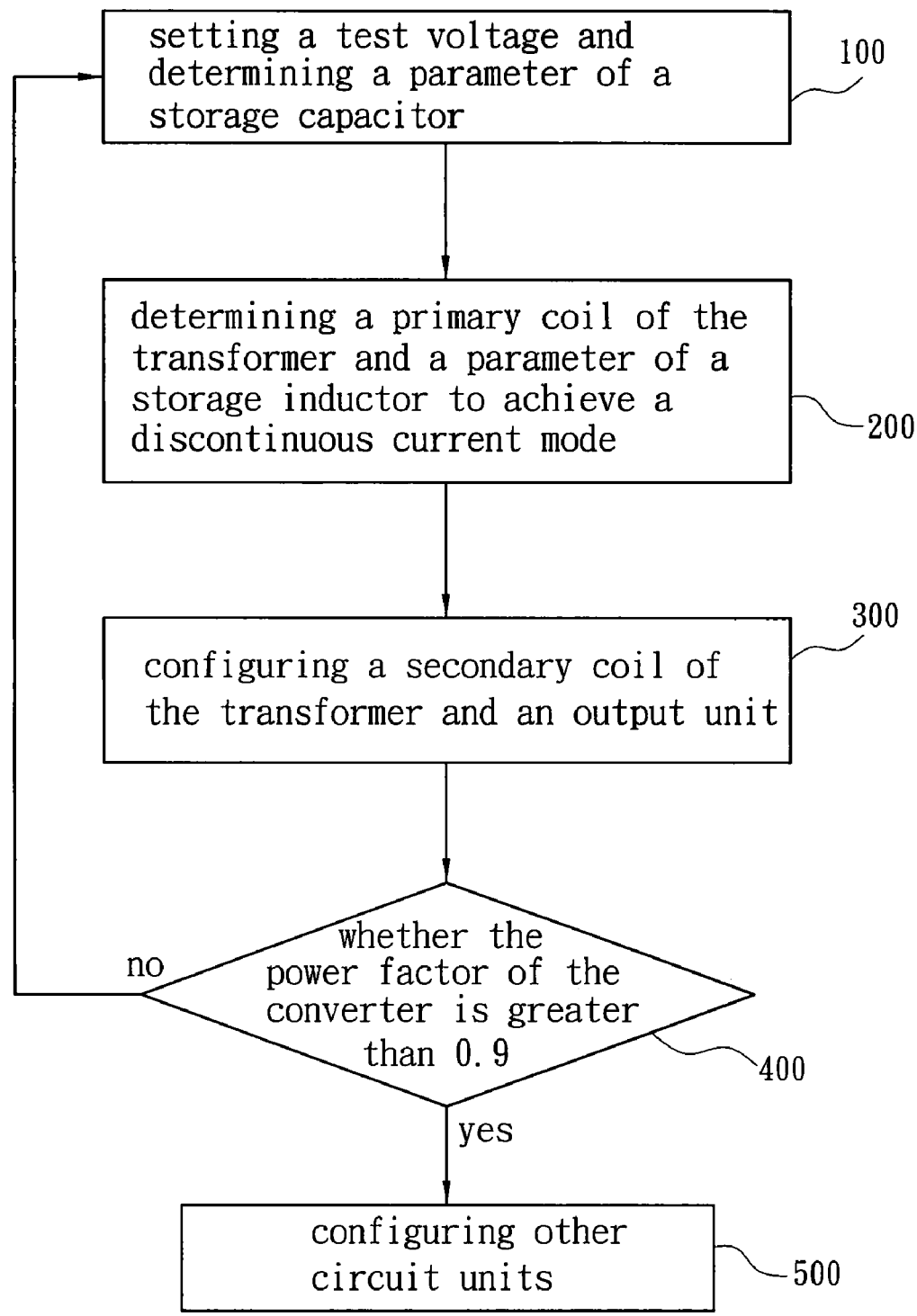
FIG. 2 is a flowchart of a method according to a first embodiment of the present invention.

The PFC circuit 3 includes a storage capacitor 32, a storage inductor 31, a switch 33 and a control unit 6. The control unit 6 controls the cycles of turning on and turning off the switch 33. The switch 33 determines the direction of the input current, i.e. determines the cycles of charging and discharging of the storage capacitor 32. The primary coil of the transformer 4 also needs a switch to determine the power transferred to the secondary coil. In the exemplification shown in FIG. 1, the switch 33 of the PFC circuit 3 is also used to control the power output by the transformer 4. As the technology that the PFC circuit 3 and the transformer 4 jointly use the switch 33 is a prior art familiar to the people of the related field, it will not repeat herein. The parameters of the storage capacitor 32 and the storage inductor 31 have great influence on the power factor. Therefore, the present invention proposes a method for configuring the parameters of these components. The method of the present invention comprises a storage capacitor configuration procedure (Procedure 1), a storage inductor configuration procedure (Procedure 2) and a verification procedure (Procedure 3). The storage capacitor configuration procedure predetermines a test voltage and a rated bus voltage lower than the test voltage, determines a parameter of the storage capacitor 32 according to the test voltage (Step 100 in FIG. 2) and uses the storage capacitor 32 to supply the rated bus voltage. The storage inductor configuration procedure selects the number of coils of the primary coil of the transformer 4 firstly and then determines an inductance of the storage inductor 31 to make the storage inductor 31 and the primary coil work in a discontinuous current mode (DCM) (Step 200 in FIG. 2). The verification procedure configures the output unit 5 according to the rated output standard (Step 300 in FIG. 2) and verifies whether the power factor of the converter exceeds 0.9 (Step 400 in FIG. 2). If the power factor does not exceed 0.9, the process returns to Step 100 to adjust the parameter of the storage capacitor 32. If the power factor exceeds 0.9, other circuit units are configured according to the safety standard or the customer's requirement. As the abovementioned other circuit units include the protection circuit, the LED-related circuit and the grounding circuit, which have been familiar to the people skilled in the art, the technology thereof will not repeat herein.

In the conventional process of designing a converter, the designer has to predetermine the rated bus voltage (usually 380V) of the PFC circuit 3, adopts a conventional energy-storage element having a withstand level equal to the bus voltage, and makes the modulated power output by the energy-storage element stably and exactly reach the predetermined bus voltage. Herein, it is necessary to make clear that the bus voltage is a voltage level, and that the average voltage of the modulated power output by the PFC circuit 3 should be boosted to the level of the bus voltage.

Figure 4:
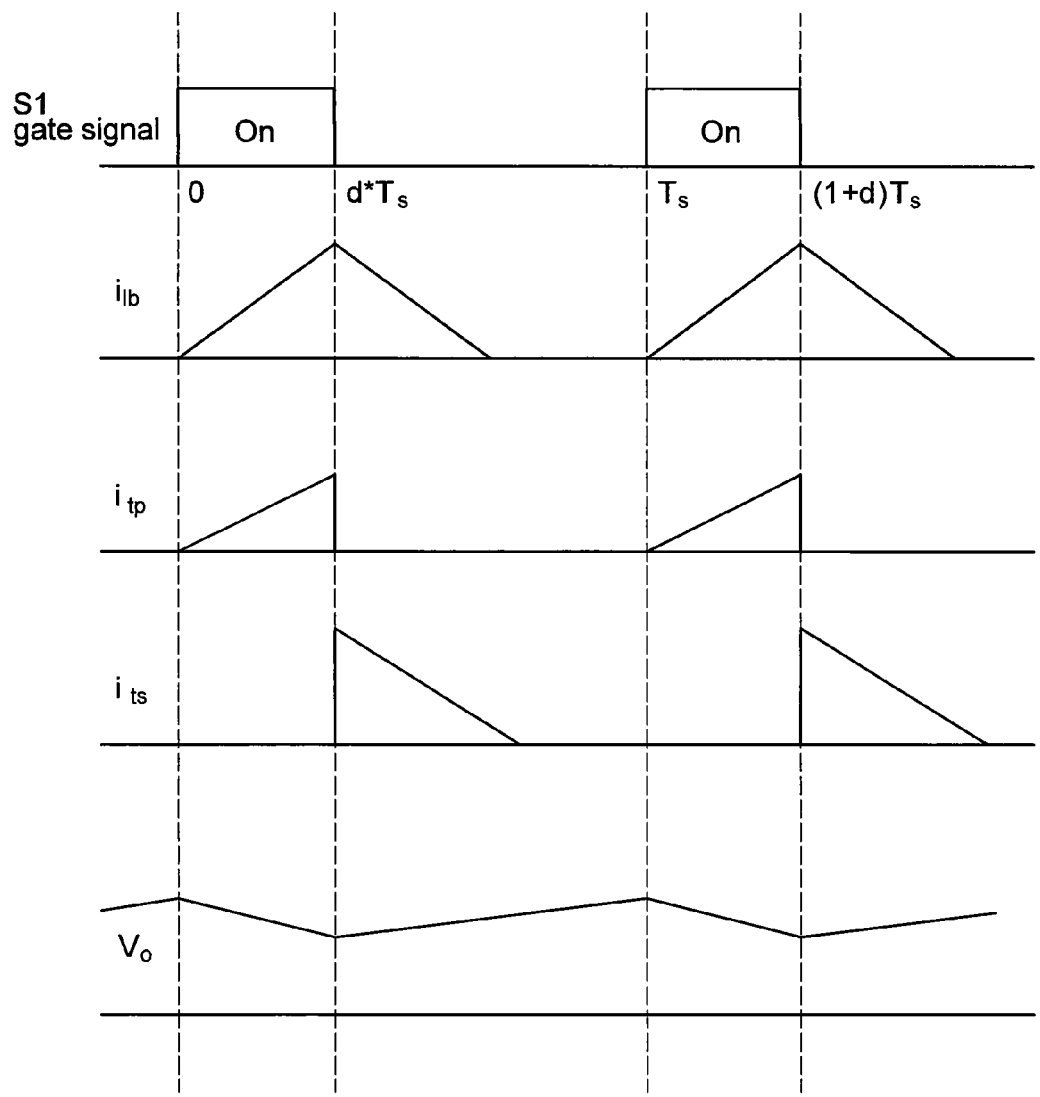
FIG. 4 is a diagram showing the waveforms of the nodes of the circuit shown in FIG. 1 according to the present invention.

In Procedure 1 of the present invention, a test voltage higher than the rated bus voltage is preset, and the parameter of the storage capacitor 32 is determined according to the test voltage. The storage capacitor 32 determined by the test voltage is used in the converter, and the control unit 6 controls the operation of the switch 33 to charge the storage capacitor 32, and then the storage capacitor 32 outputs the modulated power having a voltage reaching the bus voltage. As the storage capacitor 32 is determined by a higher test voltage, the modulated power output by the storage capacitor 32 fluctuates slightly. It means that the storage capacitor 32 receives less fluctuation of the input power. Therefore, a capacitor having a smaller capacitance can be used as the storage capacitor 32. In Procedure 2 of the present invention, the inductance of the storage inductor 31 is designed to match the number of coils of the primary coil of the transformer 4, whereby the PFC circuit 3 operates in a discontinuous current mode. The inductance of the storage inductor 31 determines the variation rate of the current flowing through the storage inductor 31. The number of coils of the primary coil of the transformer 4 also influences the increasing and decreasing rate of the current. Thus, in Procedure 2, the number of coils of the primary coil of the transformer 4 is selected firstly, and then the inductance of the storage inductor 31 is chosen to achieve a discontinuous current mode (Step 200 in FIG. 2). Refer to FIG. 1 and FIG. 4. FIG. 4 is a diagram showing the waveforms of the nodes of the circuit in FIG. 1, wherein $i_{tp}$ and $i_{ts}$ respectively denote the currents flowing through the primary coil and the secondary coil of the transformer 4, i.e. the waveforms respectively represent the power transmission processes of the primary coil and the secondary coil, and wherein $i_{lb}$ denotes the current flowing through the storage inductor 31. The current $i_{lb}$ increases firstly and then decreases to a zero-current stage in each cycle, and then a new cycle begins, whereby is achieved a discontinuous current mode. After the primary coil of the transformer 4 is decided, the secondary coil is determined according to the transformer ratio. The secondary coil of the transformer 4 is coupled to the output unit 5 to supply stable output power 7 stably. The abovementioned configuration for the PFC circuit 3 should be verified to determine whether the power factor of the converter is higher than 0.9. If the power factor is not higher than 0.9, the process returns to Procedure 1 to determine a new parameter of the storage capacitor 32. If the power factor is higher than 0.9, other circuit units are configured next (Step 500 in FIG. 2).

Figure 3:
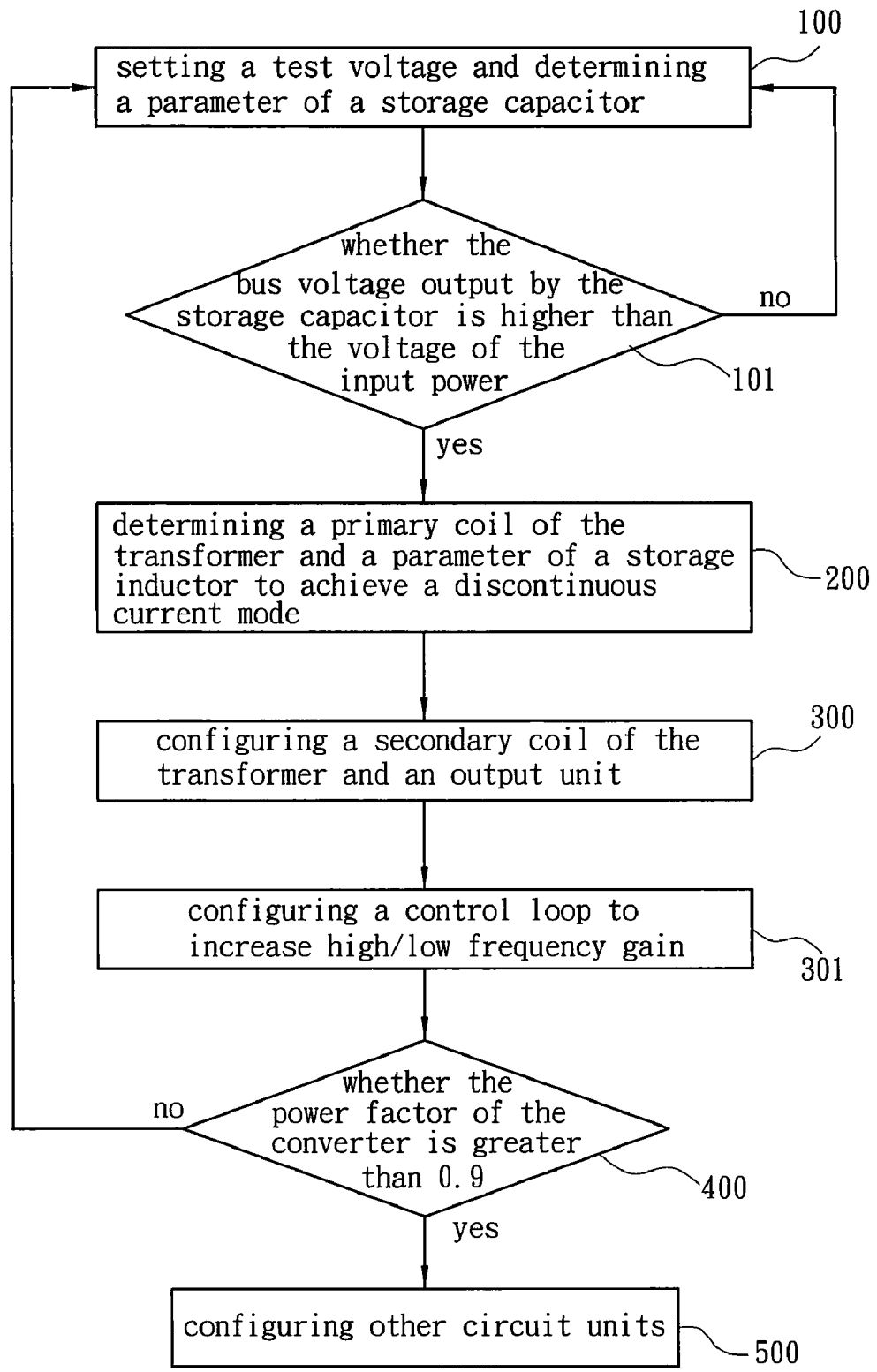
FIG. 3 is a flowchart of a method according to a second embodiment of the present invention.

Additional steps may be interposed into the above-mentioned steps to perfect the converter design. Behind Procedure 1, the method of the present invention may further comprise a bus-voltage verification step: verifying whether the voltage of the modulated power output by the storage capacitor 32 is higher than the voltage of the input power after the storage capacitor 32 has been decided in Procedure 1. If the voltage of the modulated power is higher than the voltage of the input power, the process proceeds to Procedure 2. If the voltage of the modulated power is not higher than the voltage of the input power, the process returns to Procedure 1 to determine an appropriate storage capacitor 32 once again. Behind Procedure 2, the method of the present invention may further comprise a control-loop design step: designing a control loop to provide a high/low frequency gain means to inhibit the low-frequency component output by the PFC circuit 3. Refer to FIG. 3 for a flowchart of the abovementioned process. Step 100 determines the parameter of the storage capacitor 32, and an additional Step 101 succeeds to Step 100 and verifies whether the bus voltage provided by the storage capacitor 32 is higher than the voltage of the input power. If the bus voltage is not higher than the voltage of the input power, the process returns to Step 100 to determine an appropriate parameter of the storage capacitor 32 once again. If the bus voltage is higher than the voltage of the input power, the process proceeds to determining the parameter of the storage inductor 31, configuring the number of coils of the primary coil and the secondary coil of the transformer 4, and configuring the output unit 5 (Step 200 and Step 300 in FIG. 3). Succeeds to Step 300, an additional Step 301 configures the control circuit 6 to increase the high/low frequency gain. Next, Step 400 verifies whether the power factor is greater than 0.9. According to the verification result of Step 400, the process returns to Step 100 or proceeds to Step 500 to configure other circuit units.

Figure 5:
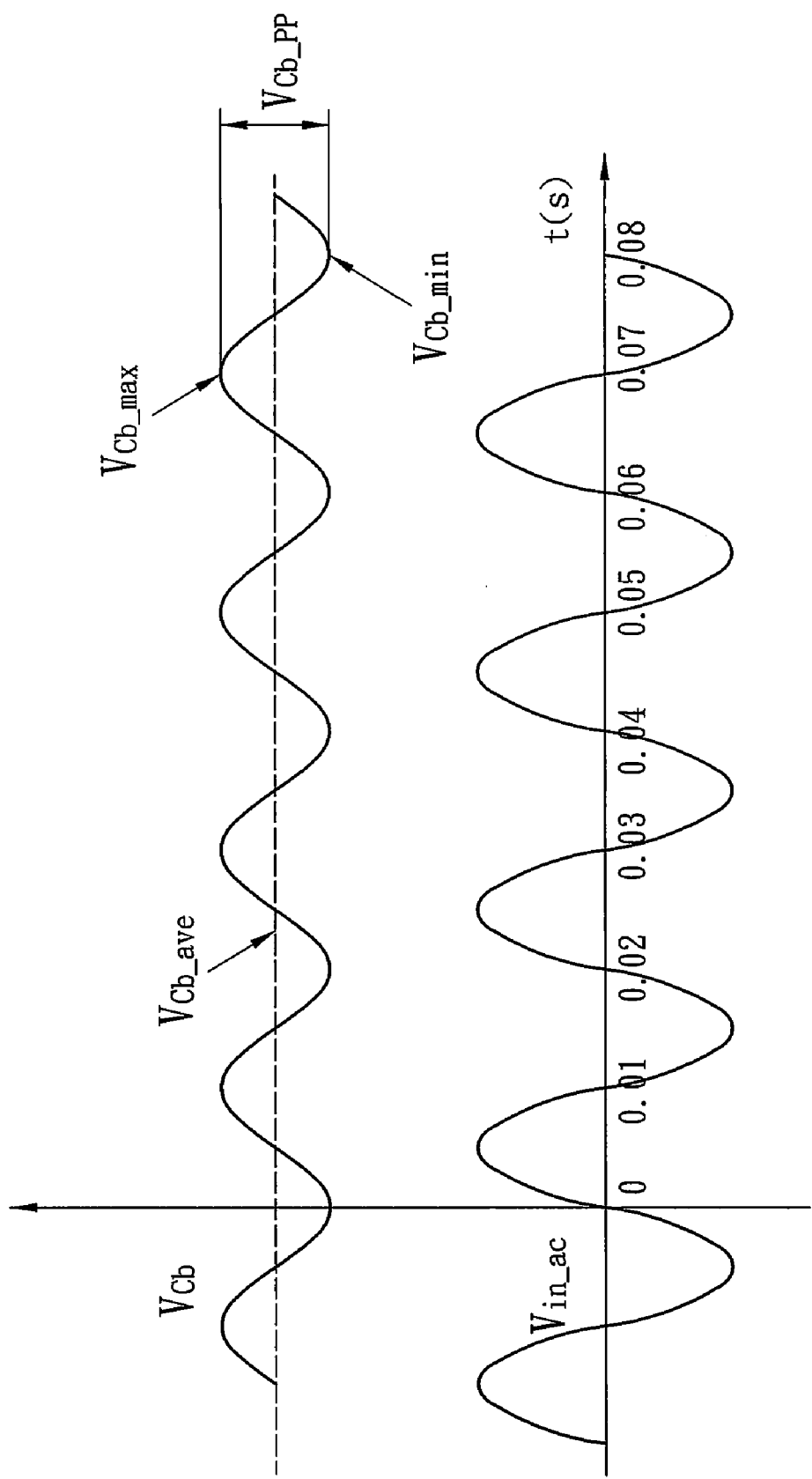
FIG. 5 is a diagram showing the waveforms of the bus voltage and the input power according to the present invention.

When the elements of the PFC circuit 3 are configured according to the abovementioned method, the parameter of the storage capacitor 32 is determined by the test voltage, and the test voltage is higher than the rated bus voltage. Refer to FIG. 5 for the waveform of the modulated power generated by the PFC circuit 3 and the waveform of the input power. $V_{in\_ac}$ denotes the input power, which is an alternating-current power in FIG. 5. The rectifier circuit 2 and the PFC circuit 3 process the input power to output a modulated power $V_{cb}$ with an average voltage reaching the bus voltage $V_{cb\_ave}$, and the bus voltage is higher than the voltage of the input power. In Procedure 1, as the storage capacitor 32 is determined by a higher test voltage, the modulated power output by the storage capacitor 32 fluctuates slightly. It means that the storage capacitor 32 receives less fluctuation of the input power. Therefore, a capacitor having a smaller capacitance can be used as the storage capacitor 32. Particularly, the designer can replace the conventionally used electrolytic capacitor with a film capacitor. Thus, the storage capacitor 32 has a longer lifetime, and the lifetime of the converter is no more limited by the lifetime of the storage capacitor 32.

Via the method of the present invention, a smaller-capacitance capacitor or a longer-lifetime capacitor, such as the film capacitor, can be used as the storage capacitor 32 of the PFC circuit 3. The method of the present invention applies to converters, adapters and power supply devices, particularly to a driving circuit of an LED lamp.

The embodiments described above are only to exemplify the present invention but not to limit the scope of the present invention. Any equivalent modification or variation according to the spirit of the present invention is to be also included within the scope of the present invention, which is based on the claims stated below.

From the above description, it is known that the present invention has improvements over the conventional technologies, and that the present invention possesses novelty and non-obviousness and meets the condition for a patent. Thus, the Inventor files the application for a patent. It will be appreciated if the patent is approved fast.

What is claimed is:

1. A parameter configuration method for elements of a power-factor-correction function converter that has a PFC (Power Factor Correction) circuit modulating an input power into a DC (Direct Current) modulated power in a discontinuous current mode and a transformer transforming said DC modulated power into an output power to a load, comprising
Procedure 1: a storage capacitor configuration procedure: predetermining a test voltage and a rated bus voltage lower than said test voltage, determining a parameter of a storage capacitor according to said test voltage, and using said storage capacitor to supply a modulated power with a voltage reaching said rated bus voltage;
Procedure 2: a storage inductor configuration procedure: determining a number of coils of a primary coil of said transformer and determining an inductance of a storage inductor to match said storage inductor and said primary coil work in a discontinuous current mode; and
Procedure 3: a verification procedure: configuring a secondary coil of said transformer and an output unit coupled to said secondary coil according to a rated output standard, verifying whether a power factor of said converter is greater than 0.9, and returning to said Procedure 1 to adjust said parameter of said storage capacitor if said power factor of said converter is not greater than 0.9.

2. The parameter configuration method for elements of a power-factor-correction function converter according to claim 1 further comprising a bus voltage verification step behind said storage capacitor configuration procedure, wherein said bus voltage verification step includes verifying whether a bus voltage of said modulated power output by said storage capacitor is higher than a voltage of said input power, and proceeding to said storage inductor configuration procedure if said bus voltage is higher than said voltage of said input power or returning to said storage capacitor configuration procedure if said bus voltage is not higher than said voltage of said input power.

3. The parameter configuration method for elements of a power-factor-correction function converter according to claim 1 further comprising a control loop design step behind said storage inductor configuration procedure, wherein said control loop design step includes designing a control loop to provide a high/low frequency gain means to inhibit a low-frequency component output by said PFC circuit.

4. The parameter configuration method for elements of a power-factor-correction function converter according to claim 1, wherein said rated bus voltage is higher than a voltage of said input power.

* * * * *